United States Patent Office 2,820,060
Patented Jan. 14, 1958

2,820,060

PREPARATION OF ORGANIC THIOLS

Hillis O. Folkins, Crystal Lake, and Elmer L. Miller, Cary, Ill., assignors to The Pure Oil Company, Chicago, Ill., a corporation of Ohio No Drawing. Application July 23, 1954
Serial No. 445,481

8 Claims. (Cl. 260—609)

This invention relates to the production of organic thiols and is specifically directed to a method and a composite catalyst for increasing the efficiency of the reaction between a monohydric alcohol and hydrogen sulfide to produce said organic thiols. This application is a continuation-in-part of application Serial No. 370,642, filed July 27, 1953.

Mercaptans as a class of compounds may be produced from a variety of raw materials and by means of a plurality of processes. The more adaptable of these processes involves the addition of the sulfhydryl radical to a suitable nucleus. Most commercial scale processes for the formation of relatively high molecular weight thiols involved the direct addition of hydrogen sulfide to olefinic hydrocarbons in the presence of suitable catalysts. However, the mechanism of the reaction precludes its use in the preparation of methanethiol.

Although it is one of the most classic methods, having been discovered by Sabatier, and entails as simple a mechanism as the reaction between hydrogen sulfide and olefinic hydrocarbons, the dehydration of monohydric alcohols by interreacting hydrogen sulfide therewith in the presence of a metallic oxide has never been commercially adapted to the production of thiols because of the indifferent results obtained when the process was practiced according to the prior art techniques. It has been found, however, that this reaction may be carried out efficiently and economically in the commercial production of organic thiols, especially methanethiol, by suitably modifying the techniques described in the prior art.

Earlier development work in the production of methanethiol employing methanol and hydrogen sulfide as reactants was concerned primarily with manipulative techniques for improving the efficiency of the reaction. For example, it was found that by carrying out the reaction in the presence of small amounts of water, the efficiency of the reaction was considerably enhanced. This discovery is disclosed and claimed in U. S. Patent 2,685,605. In addition, the use of critical amounts of hydrogen was also found to have a beneficial effect on the conversion. This improvement is disclosed and claimed in U. S. Patent 2,647,151. The catalysts employed in this work were the metallic oxides disclosed in the prior art. Earlier investigations of this reaction, such as that reported by Kramer and Reid, J. A. C. S., 43 (880), (1921), indicated that thoria was the most effective catalyst for carrying out the reaction. Subsequent work confirmed this and produced results which evidenced that thoria was about twice as effective as zirconia, the next best metallic oxide for carrying out the reaction employing the lower molecular weight alcohols. It has now been found that other compositions may be employed as catalysts for increasing the efficiency of the reaction between an alcohol and hydrogen sulfide to produce an organic thiol to the extent that the process has commercial value.

Accordingly, it is an object of this invention to provide a contact or solid catalyst capable of producing high yields of organic thiols from the reaction between a monohydric alcohol and hydrogen sulfide. A further object of this invention is to provide a catalyst which will have a directing effect for selectively catalyzing the reaction of monohydric alcohols and hydrogen sulfide to produce increased amounts of corresponding thiols by minimizing the formation of by-products of the reaction such as sulfides, ethers, and unsaturates. Another object of this invention is to provide an efficient and effective catalytic process for the production of methanethiol, the lowest molecular weight organic thiol.

According to this invention it has been found that organic thiols may be produced from the reaction of monohydric alcohols and hydrogen sulfide, in higher yields and with increased selectivity of conversion than has been reported for processes employing prior art catalysts, by the use of improved composite catalyst consisting essentially of activated aluminum oxides whose activity is promoted by incorporating in the catalyst composition small amounts of at least one oxide of the alkali metals, namely, oxides of lithium, sodium, potassium, rubidium and cesium.

To illustrate the instant invention, a number of catalysts were employed as contact catalysts in the reaction between methanol and hydrogen sulfide. A reaction mixture of hydrogen sulfide and methanol in a mol ratio of 2 to 1 containing about 0.33 mol percent of water was contacted with the catalyst at a temperature of about 750° F. and at 1 atmosphere pressure in a suitable reactor. Each run was conducted using a liquid volume hourly spaced velocity, based on methanol, of 0.38. This liquid volume hourly space velocity is defined as the liquid volume of methanol feed used per hour per unit volume of catalyst in the reactor. The various results obtained for each catalyst are summarized in Table I.

Table I

| Run | Catalyst composition | Conversion, mol percent | Selectivity, percent | Mercaptan yield, mol percent |
|---|---|---|---|---|
| 1 | $Al_2O_3$-$K_2O$ (2 wt. percent) | 82.8 | 86.4 | 71.5 |
| 2 | $Al_2O_3$-$K_2O$ (2 wt. percent) | 81.7 | 86.4 | 70.6 |
| 3 | $Al_2O_3$-$K_2O$ (1 wt. percent) | 77.9 | 76.1 | 59.3 |
| 4 | $Al_2O_3$-$Li_2O$ (2 wt. percent) | 72.4 | 84.3 | 61.0 |
| 5 | $Al_2O_3$-$Na_2O$ (1 wt. percent) | 71.5 | 75.5 | 54.0 |
| 6 | $Al_2O_3$ | 68.5 | 67.7 | 46.4 |
| 7 | $Al_2O_3$-$ThO_2$ (2 wt. percent) | 63.9 | 72.0 | 46.0 |
| 8 | Pumice-$K_2O$ (2 wt. percent) | 0.0 | | 0.0 |

It is seen from Table I that the larger yields of methanethiol are obtained when the promoted catalysts of this invention are employed, as compared with activated alumina alone, a result made more unusual when it is seen that the pumice-supported potassium oxide catalyst evinces no catalytic activity. The substantially neutral effect of thoria as an activity promoting reagent when in combination with activated alumina is also to be noted. Similarly, the properties of the catalysts of this invention for selectively catalyzing the reaction to produce methanethiol are illustrated by the selectivity data. This selectivity feature of the catalyst is defined as the percent of reacted methanol which was converted into methanethiol.

The following examples are illustrative of the beneficial effect attained in the preparation of the higher molecular weight thiols employing the promoted alumina catalysts of this invention:

Ethanol and hydrogen sulfide were passed over various catalysts at 600° F. and at a molal ratio of hydrogen sulfide to ethanol of 2.9. A liquid volume hourly space velocity, based on ethanol, of 0.39 was maintained.

Under these conditions the following yields and selectivities for mercaptan formation were realized:

Table II

| Catalyst composition | Conversion, mol percent | Selectivity, percent | Mercaptan yield, mol percent |
| --- | --- | --- | --- |
| $Al_2O_3$ | 93.0 | 45.8 | 42.6 |
| $Al_2O_3$–$K_2O$ (4 wt. percent) | 64.0 | 91 | 58 |
| $Al_2O_3$–$Na_2O$ (1 wt. percent) | 84.0 | 63.3 | 54 |

In another comparative test octanol-1 and hydrogen sulfide were reacted over an alumina catalyst at 550° F. The liquid hourly volume space velocity, based on octanol, was 0.39 and the reactants were charged in a molal ratio of hydrogen sulfide to octanol of 7.7. Under these conditions 100 percent of the octanol was converted resulting in a 34 mol percent yield of mercaptan. Hence selectivity was only 34 percent. Over a catalyst composed of alumina containing 4 weight percent potassium oxide a mercaptan yield of 50 mol percent with a selectivity of 55% was obtained under the same conditions of operation.

With cetyl alcohol and hydrogen sulfide, in molal ratio of hydrogen sulfide to alcohol of 3 to 1 over activated alumina alone at about 500° F., about 90 percent of the alcohol is converted and a molal yield of cetyl mercaptan, based on the charged alcohol, of 52 percent is obtained. Employing a catalyst composed of activated alumina promoted by 4 weight percent lithium oxide, a molal yield of 60 percent results at an over-all conversion of about 88 percent.

It is thus seen that according to the instant invention, the preparation of thiols having from 1–16 carbon atoms per molecule from the corresponding monohydric alcohol is greatly facilitated. The alcohols which are employed in carrying out the subject reaction are the primary, secondary, and tertiary aliphatic monohydric alcohols having 1–16 C atoms per molecule. In addition aryl derivatives of carbinol, such as phenyl, benzyl, phenyl propyl alcohol, or other carbinols, having up to about 16 C atoms per molecule may be employed in this invention.

The catalyst of this invention may be prepared by any of the techniques which are conventionally employed in catalyst manufacture. A uniform distribution of the alkali metal oxide promoter throughout the alumina may be effected by permeating or impregnating alumina with a suitable salt solution, by adding a decomposable alkali metal salt to a slurry of aluminum hydroxide and decomposing, or by mechanically admixing the components of the composite catalyst which have been prepared by separate precipitation. The amount of alkali metal oxide promoter which may be added to the alumina to enhance its catalytic properties may be between about 0.5% by weight to 15% by weight and preferably between about 0.5% by weight to 8% by weight, although in some instances amounts outside these ranges may be desirable. In the appended claims the promoter employed is described as being contained in the alumina component of the catalyst. By this it is meant that the activity promoting reagent is incorporated in the catalyst composition by any of the conventional catalyst preparation techniques, such as those suggested above, wherein an activity promoting reagent is introduced into the catalyst composition.

The activated aluminas which may be employed in a major proportion in the composite catalyst are those types of sorptive aluminum oxides which in general have surface areas in excess of around 10 square meters per gram. Activated alumina resulting from either naturally occurring materials such as bauxites or those prepared synthetically may be used. A common variety is prepared by controlled calcination of a rock-like form of alpha alumina trihydrate. This type is exemplified by Alcoa Activated Alumina Grade F. A second variety typified by Alcoa Activated Alumina Grade H is composed of translucent granules prepared from a gelatinous alumina which has a high surface area even before any decomposition of the alumina hydrate is effected. A third variety of sorptive alumina comprises discrete particles of such small size that they have appreciable area on their outer geometric surface. Examples of this type are Alcoa Activated Alumina R-2396 and Alcoa Activated Alumina XF-21. The size and shape of the catalyst will be determined by how the catalyst is going to be employed. The subject invention may be carried out in a static or moving bed type of reactor employing granular or pelleted catalysts. However a fluidized system may also be used and in this instance a finely comminuted catalyst may be used.

In the use of the catalysts of the present invention for the production of thiols, the reaction between hydrogen sulfide and the alcohol employed may be carried out, as pointed out above, in either a fixed bed process or in a process in which the catalyst moves through the reaction zone. In employing the fixed bed type of reaction, temperatures in the order of 300–930° F. may be employed. Generally optimum temperatures will be lower when higher molecular weight alcohols are used as reactants. In the reaction of methanol and hydrogen sulfide to produce methanethiol, temperatures in the range of 575–930° F. are preferred. With higher alcohols, such as octanol, preferred temperatures are in the range of 400–750° F. Pressures may vary widely. Superatmospheric pressures up to about 200 pounds per square inch gauge are preferably used although higher pressures may be used. However, the reaction also may be carried out at subatmospheric or atmospheric pressure. The mol ratio of the reactants may range from about 0.5 to about 10 mols of hydrogen sulfide to 1 mol of alcohol. Although it is generally preferred to maintain an excess of hydrogen sulfide in the reactant mixture, it may be desirable to employ substantially stoichiometric proportions in order to avoid unnecessary complications that may occur, for example, in the recovery system. Throughput rates will vary with the temperatures and will in general be from about 0.1 to about 5 volumes of alcohol per volume of catalyst per hour. This variable is also known as the above defined liquid volume hourly space velocity.

The foregoing examples are only illustrative of the application of this invention to the preparation of thiols. Alcohols which may be used in carrying out this invention are those monohydric alcohols having from 1 to 16 carbon atoms per molecule. Such alcohols include the primary, secondary and tertiary aliphatic alcohols. Specific examples include methanol, ethanol, butanol-1, butanol-2, tert-octyl alcohol, octanol-1, dodecanol-1, dodecenyl alcohols, cetyl alcohol, etc. Mixtures of alcohols, such as "Lorol" containing alcohols of 10–16 carbon atoms, may be used also. Also applicable in the instant invention are the aryl derivatives of carbinol having not more than 16 carbon atoms per molecule, such as phenyl, benzyl, tolyl, xylyl, mono, di, and tri methyl phenyl carbinols, phenyl propyl alcohol, etc.

The recovery of the organic thiols from the reactor effluent may be effected by various alternatives which may be adapted to local conditions or changing economics. One method of separation involves fractional condensation and stabilization, or, the physical principles of adsorption may be employed to recover the thiol from the reactor effluent. Several variations in recovery techniques are described in copending patent application Serial No. 431,230 filed May 20, 1954, which relates to a continuous method for the production and recovery of methanethiol produced in a manner similar to the instant invention. In the production of the higher molecular weight thiols some changes in the recovery system as determined by the nature of the products will be necessary. For example, in the preparation of the lower molecular weight thiols the reaction product upon condensation is an admixture of normally gaseous and normally liquid products. Obviously the recovery system will have to be designed to handle this heterogeneous mixture. However, the treatment of the products of the reaction between the higher molecular weight alcohols and hydrogen sulfide is somewhat simpler. In this instance the products are mainly liquids with very low vapor pressure and entrainment with the residual hydrogen sulfide is the only factor if importance. Consequently, the reaction product can be processed in a stripper which removes the excess hydrogen sulfide for recycling. The product then passes on to a fractionator where the product is separated from unreacted alcohol and by-products. The crude product then is passed to a thiol fractionating unit. The thiols are withdrawn from the mercaptan tower and pass to storage. These techniques, of course, are only illustrative as other processing expedients for the recovery of the thiol product from the reaction effluent will be apparent to those skilled in the art.

The catalysts which are described by this invention, in addition to producing increased yields of organic thiols by means of enhanced conversion and selectivity, also have other important characteristics. These catalysts are more economical to produce, are less susceptible to attrition, have a longer life, and are less susceptible to deactivation by increased operating temperatures than the preferred thoria catalyst described in the prior art. These properties permit the catalyst to be readily employed in a fluidized operation for the production of thiols from the reaction of an alcohol and hydrogen sulfide.

It is to be understood that the foregoing examples of this invention are only illustrative. Other modifications of the manipulative technique employed in carrying out this invention will be apparent to those who are skilled in the art, and are accordingly within the scope of the invention as defined in the appended claims.

We claim:

1. In the method for producing an organic thiol by the reaction between hydrogen sulfide and a $C_1$–$C_{16}$ monohydric alcohol selected from the group consisting of alkanols, monocyclic aryl-substituted alkanols and monocyclic aralkyl-substituted alkanols, at a temperature within the range of 300–930° F. and at a suitable mol ratio of hydrogen sulfide to alcohol to effect the production of said thiol as the principal product of said reaction, the improvement which comprises conducting said reaction in the presence of an activated alumina catalyst containing, as an activity-promoting agent, about 0.5% to 15% by weight, based on the catalyst composition, of at least one alkali metal oxide.

2. In the method for producing an organic thiol by the reaction between hydrogen sulfide and a $C_1$–$C_{16}$ monohydric alcohol selected from the group consisting of alkanols, monocyclic aryl-substituted alkanols and monocyclic aralkyl-substituted alkanols, at a temperature within the range of 300–930° F., a mol ratio of hydrogen sulfide to alcohol of about 0.5–10:1 and a liquid volume hourly space velocity (based on alcohol) of about 0.1–5, the improvement which comprises conducting said reaction in the presence of an activated alumina catalyst containing, as an activity-promoting agent, about 0.5% to 15% by weight, based on the catalyst composition, of at least one alkali metal oxide.

3. A method for producing organic thiols by reacting hydrogen sulfide and an alkanol having 1–16 carbon atoms per molecule in a ratio from about 0.5 to 10 mols of hydrogen sulfide per mol of alkanol, at a temperature within the range of about 300–930° F., and a liquid volume hourly space velocity of about 0.1–5 based on said alkanol, in the presence of an activated alumina catalyst containing, as an activity-promoting reagent, about 0.5% to 15% by weight, based on the catalyst composition, of at least one alkali metal oxide.

4. A method in accordance with claim 3 in which the alkali metal oxide is potassium oxide.

5. A method in accordance with claim 3 in which the alkali metal oxide activity-promoting agent is lithium oxide.

6. A method for producing methanethiol by reacting hydrogen sulfide and methanol in a ratio from about 0.5–10 mols of hydrogen sulfide per mol of methanol, at a temperature within the range of about 575–930° F. in the presence of an activated alumina catalyst containing, as an activity-promoting agent, about 0.5 to 15% by weight, based on the catalyst composition, of at least one alkali metal oxide.

7. A method in accordance with claim 6 in which the alkali metal oxide activity-promoting agent is potassium oxide.

8. A method in accordance with claim 6 in which the alkali metal oxide activity-promoting agent is sodium oxide.

References Cited in the file of this patent

UNITED STATES PATENTS

| | | |
|---|---|---|
| 2,116,182 | Baur | May 3, 1938 |
| 2,454,227 | Smith et al. | Nov. 16, 1948 |
| 2,474,440 | Smith et al. | June 28, 1949 |
| 2,667,515 | Beach et al. | Jan. 26, 1954 |